United States Patent [19]

Suido et al.

[11] Patent Number: 5,427,813

[45] Date of Patent: Jun. 27, 1995

[54] DESALTED WHEY CONTAINING NON-PROTEIN NITROGEN AND PROCESS FOR PRODUCING THE SAME

[75] Inventors: Shigeko Suido; Hatsumi Hama, both of Tokyo; Toshitaka Kobayashi, Saitama, all of Japan

[73] Assignee: Meiji Milk Products Company Limited, Tokyo, Japan

[21] Appl. No.: 154,455

[22] Filed: Nov. 19, 1993

Related U.S. Application Data

[63] Continuation-in-part of Ser. No. 762,964, Sep. 20, 1991, abandoned.

[30] Foreign Application Priority Data

Jan. 22, 1991 [JP] Japan ................................. 3-81063

[51] Int. Cl.⁶ ............................................. A23C 9/15
[52] U.S. Cl. ................................ 426/583; 426/271; 426/330.2
[58] Field of Search ................ 426/330.2, 583, 271, 426/239

[56] References Cited

U.S. PATENT DOCUMENTS

| | | |
|---|---|---|
| 2,477,553 | 8/1949 | Almy et al. |
| 2,650,166 | 8/1953 | Tinkler et al. |
| 3,896,241 | 7/1975 | Malaspena ............................ 426/583 |
| 3,930,039 | 12/1975 | Kuipers ................................ 426/271 |
| 4,036,999 | 7/1977 | Gundstaff ............................. 426/583 |
| 4,064,283 | 12/1977 | Saunders .............................. 426/583 |
| 4,089,987 | 5/1978 | Chang .................................. 426/583 |
| 4,138,501 | 2/1979 | Chaveron ............................. 426/271 |
| 4,159,350 | 6/1978 | Jonsson ................................ 426/271 |
| 4,204,008 | 5/1980 | Saunders .............................. 426/583 |
| 4,352,828 | 10/1982 | Realland .............................. 426/583 |
| 4,497,836 | 2/1985 | Marquardt ........................... 426/583 |
| 4,543,261 | 9/1985 | Harmon ............................... 426/271 |
| 4,803,089 | 2/1989 | Chaveron ............................. 426/271 |
| 4,834,994 | 5/1989 | Kuwata ................................ 426/271 |
| 4,844,923 | 7/1989 | Herrmann ............................ 426/271 |
| 4,897,279 | 1/1990 | Lehmann ............................. 426/583 |

FOREIGN PATENT DOCUMENTS

| | | |
|---|---|---|
| 1016391 | 8/1977 | Canada . |
| 0315135 | 2/1988 | European Pat. Off. . |
| 2822000 | 12/1978 | Germany . |
| 7810035 | 4/1980 | Netherlands . |
| 2019189 | 10/1979 | United Kingdom . |
| 2188526 | 10/1987 | United Kingdom . |

OTHER PUBLICATIONS

Patent Abstracts of Japan, vol. 9, No. 184 (C-294) 1985 & JP-A-60 054 637 (abstract).

R. A. M. Delaney, "Demineralization of Whey", The Australian Journal of Dairy Technology, vol. 31, No. 1, 1976.

R. Delbeke, "Purification of an Ultrafiltration Permeate with Adsorbent and Ion-Exchange Resins", p. 183, Table 2; Netherlands Milk and Dairy Journal, vol. 33, No. 4, 1979, pp. 181–192.

A. Hill et al, "Quantification and Characterization of Whey Protein Fractions Separated by Anion Exchange Chomotography" (p. 693, col. 2, FIGS. 1–3), Milchwissenschaft, vol. 42, No. 11, 1987, pp. 693–696.

*Primary Examiner*—Carolyn Paden
*Attorney, Agent, or Firm*—Browdy and Neimark

[57] ABSTRACT

Whey or whey concentrate is adsorbed on an ion-exchange resin and non-protein nitrogen (NPN) is selectively desorbed by the use of whey or whey concentrate or eluent, thereby whey, whey concentrate or solution with sodium of a low content and with NPN of a high content being obtained efficiently.

1 Claim, 9 Drawing Sheets

FIG. 1
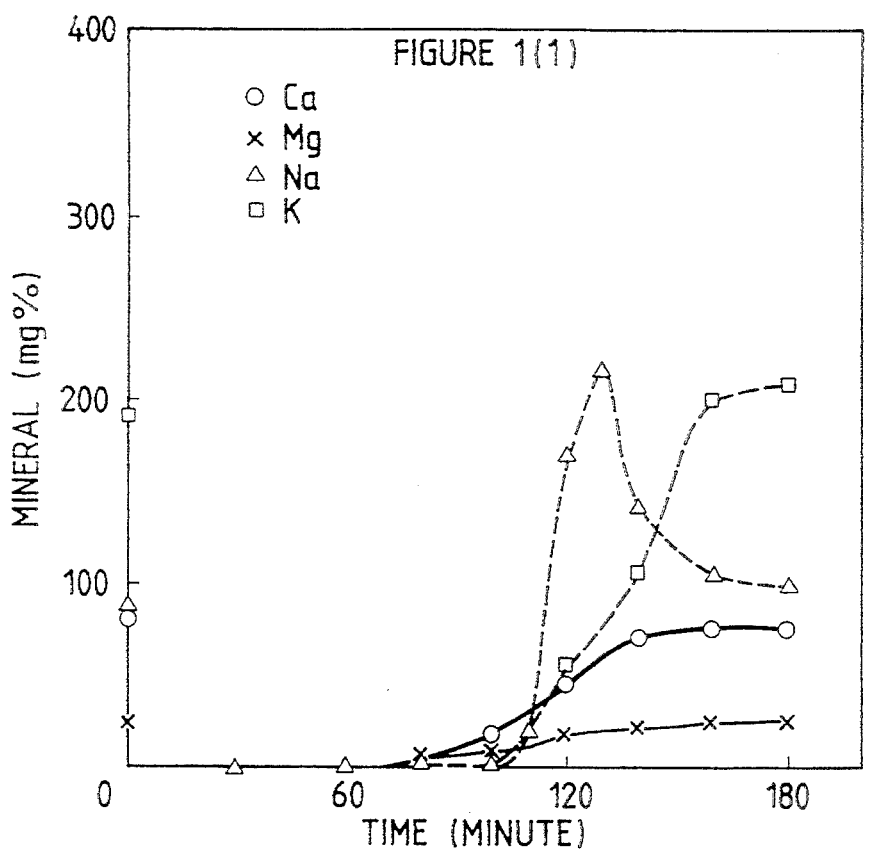
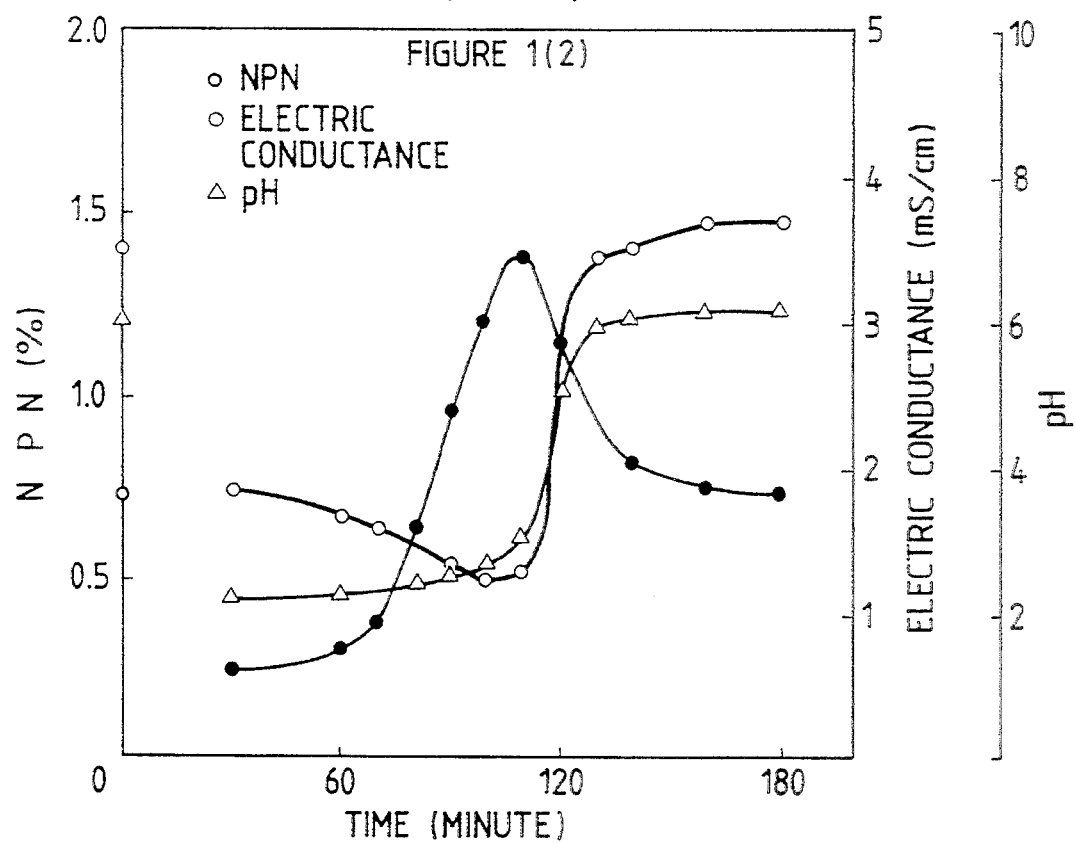

DESALTED WHEY CONTAINING NON-PROTEIN NITROGEN AND PROCESS FOR PRODUCING THE SAME

This application is a continuation-in-part of parent application Ser. No. 762,964, filed on Sep. 20, 1991 now abandoned.

DETAILED DESCRIPTION OF THE INVENTION

1. Field of the Invention

This invention relates to effective utilization of whey. More particularly, it relates to whey or whey concentrate and solution with low contents of minerals (especially content of sodium) and with high content of nonprotein nitrogen (hereinafter abbreviated as NPN in some cases), to processes for producing the same, and to the utilization of the same.

The whey, the whey concentra and the solution of this invention are novel substances, which are useful as a nutritive or functional food and can also be utilized for isolation and recovery of NPN. Hence, this invention is intended to provide effective utilization of whey which is a substance of rather narrow application compared with other milk-derived substances.

2. Prior Art

It is known that whey is liquid obtained by separating curd from milk, which is a by-product from the manufacture of cheese or casein and is used as a material for the production of lactose [p. 594 in "Comprehensive Dictionary on Foodstuffs (Revised Edition)" edited by Y. Sakurai and published from Tokyo Dobun-Shoin (Mar. 15, 1971)].

Because of its rather narrow application, whey had been discarded before it was found to be useful as a material for the production of lactose as mentioned above. In recent years, however, a new application was also found in which desalted whey powder (Modified Solid Powder, MSP), prepared by subjecting whey to electrodialysis or ion-exchange treatment, is used as a milk-serum protein [p. 650-651 in "Comprehensive Food Industry (New, Enlarged Edition)" edited by Y. Sakurai and three other writers and published from Kosei-sha Koseikaku (Sep. 15, 1975)].

PROBLEMS TO BE SOLVED BY THE INVENTION

In the manufacture of milk-serum protein described above, whey is subjected to electrodialysis or ion-exchange treatment to remove sodium and other minerals because minerals put heavy demands on the kidney, and the resulting solution containing the minerals removed, which is a by-product in this manufacturing process, has been discarded because it is of no use.

NPN contained in whey is physiologically nutritional, but most of it is cationic and is therefore removed by desalting together with minerals; hence, it could not be utilized at all.

NPN contains many effective components having a physiological activity, such as a variety of water-soluble amino acids and low-molecular peptides, but is amphoteric. Hence, when whey is desalted by treatment with an ion-exchange resin, positively charged NPN is adsorbed on a cation-exchange resin.

Amino acids and other low-molecular nitrogen compounds, for example, have a variety of physiological activities. Discarding NPN containing these components together with minerals is indeed a waste of useful resources.

BRIEF EXPLANATION OF THE DRAWINGS

FIG. 1
This illustrates the changes with time in the contents of minerals in whey concentrate treated with a cation-exchange resin [FIG. 1(1)], and also illustrates the changes with time in NPN content, electric conductance and pH [FIG. 1(2)].

MEANS TO SOLVE THE PROBLEMS

Figure 2:
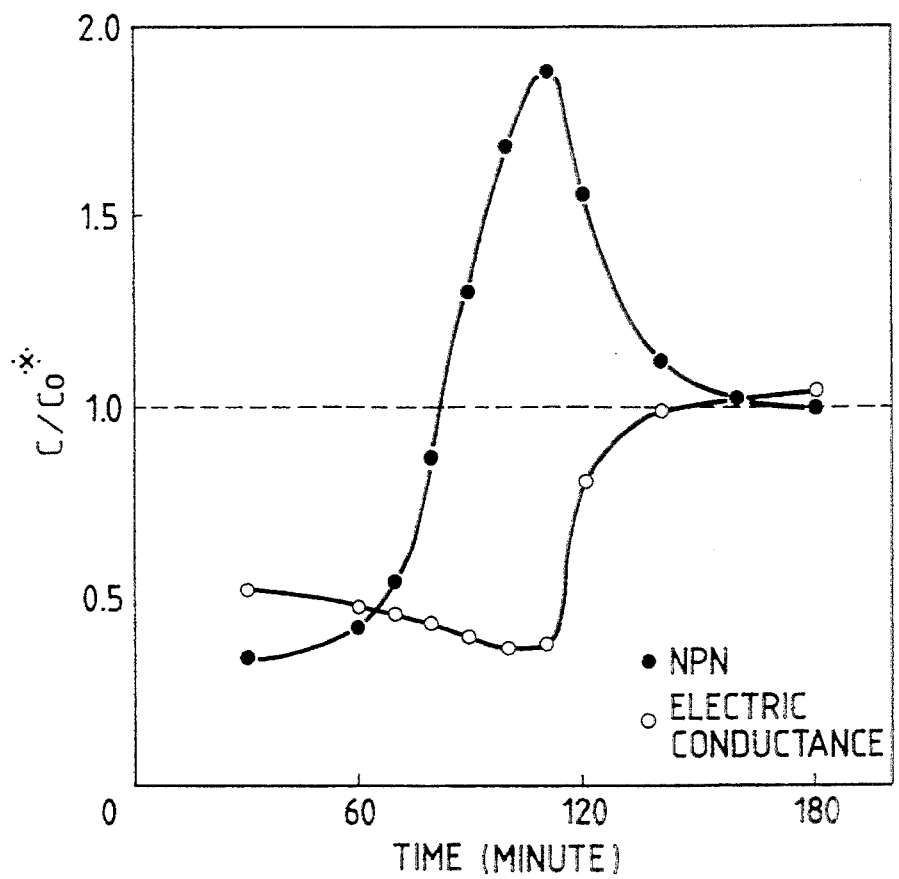
FIG. 2
This illustrates the changes with time in the NPN content and electric conductance of whey concentrate treated with a cation-exchange resin.

Under the circumstances, this invention was intended to effectively utilize NPN which had been discarded together with minerals.

More specifically, this invention was intended to isolate NPN and minerals from whey and to selectively concentrate and recover NPN alone. In other words, the object of this invention is to attain a high content of NPN in whey, whey concentrate and solution, and conversely to decrease the contents of minerals, especially the content of sodium.

Examinations were made in various aspects to achieve the object described above, and our studies were concentrated on the use of ion-exchange treatment. As a result, it was found that NPN alone can be selectively recovered by utilizing the difference in the degree of selective adsorption on a cation-exchange resin between NPN and minerals, if proper treating conditions are selected. To be specific, two methods of recovering NPN were discovered—a method of recovering NPN in desalted whey by desorbing NPN adsorbed on a resin by the use of whey, and a method of recovering NPN by the use of an eluent. This invention was accomplished on the basis of these findings.

Thus, this invention is based on the idea that NPN and minerals (especially sodium) adsorbed on a resin are separated from each other by utilizing their difference in ion-exchange selectivity.

Hence, this invention provides whey products and solution with minimized contents of minerals (especially sodium), and whey products and solution with a high content of NPN, and establishes the industrial processes for producing these products. In addition, it is also possible to selectively recover NPN alone.

This invention will be described below in more detail.

When treating a salt or electrolyte solution with an ion-exchange resin, ion concentration, valence and atomic weight may be mentioned as the factors related to the degree of selective adsorption of the ions. When using, for example, a strongly acidic, cation-exchange resin to treat a salt or electrolyte solution of low concentration at an ordinary temperature, the degree of selective adsorption of the ions is higher with greater valence of the ions, and with larger atomic number for the same valence.

An experiment was then performed, in which whey was passed through a column of a cation-exchange resin (a hydrogen type regenerated from a strongly acidic resin, Amberlyte IR120A (trade name)) and the distribution of adsorption zones for NPN and individual minerals was examined. It was found that the distribution depends on the concentration, volume and desalting degree (achieved by electrodialysis) of the whey applied, as well as the linear velocity and the height of column layer.

The best conditions for these factors were determined from the results obtained in the Examples described below, thereby succeeding in selectively recovering NPN alone by desorbing NPN adsorbed on the resin by the use of whey.

Both of anion-exchange resins and cation-exchange resins may be used in this invention. As cation-exchange resins, both weakly acidic and strongly acidic resins may be employed, and satisfactory results can be obtained by the resins commercially available. As examples of the commercially available resins, there may be mentioned Amberlyte IR120A, IR120, IR112 and XE100 (trade names); Dowex 30 and Dowex 50 (trade names); and Diaion SK series and PK series (trade names).

As whey to be treated with an ion-exchange resin, there may be used untreated whey, but the use of concentrated and/or desalted whey (often called whey concentrate) is preferable. As the degree of concentration, the total solid (TS) in whey should preferably be in the range from 10 to 40%, more preferably in the range from about 20% to about 30%. As the degree of desalting, the demineralization rate in electrodialysis (ED) should preferably be in the range from 30 to 80%, more preferably in the range from about 50% to about 70%. The concentration and desalting may be performed by methods commonly employed.

In the ion-exchange treatment of whey or whey concentrate, NPN can be separated more efficiently from minerals (especially sodium which is very close to NPN in distribution zone and whose removal is strongly demanded for the sake of health) with increasing height of column layer and decreasing linear velocity. With a column of 24 mm diameter, for example, the height of column layer should preferably be at least 50 cm, more preferably at least 80 cm, and the linear velocity should preferably be 10 m/h or less, more preferably 3 m/h or less.

As is apparent from the Examples described later, the selective adsorptivity of NPN is lower than that of sodium which is the lowest among minerals. In other words, when performing elution or desorption, NPN will flow out first from the column; hence, NPN alone can be selectively recovered if the collection of effluent from the column is continued until sodium and other minerals start to flow out.

For this purpose, it is necessary to measure the changes with time in the composition of effluent (for example, the contents of NPN and sodium). In industrial operations, however, measurement by sampling is not satisfactory, and real-time and continuous measurement is essential.

In the processes of this invention, electric conductance and pH are measured by using known devices (e.g., conductance measuring cell) and the effluent is collected as NPN fraction until electric conductance and pH begin to increase, because electric conductance and pH begin to increase when the NPN content reaches its peak. Alternatively, one may determine, by a preliminary test, the time required for the NPN content to reach its peak, and collect the effluent during this time. In addition, the NPN recovery rate varies with the amount of whey treated; for example, when the NPN recovery rate is about 80%, the recovery rate of minerals (especially sodium) is as low as 10%. Hence, if these correlations are previously determined experimentally, one can recover NPN alone on an industrial scale based on these data.

It is now possible to recover NPN alone by treating whey or whey concentrate with an ion-exchange resin and desorbing the adsorbed NPN alone by the use of whey or whey concentrate. Whey or whey concentrate thus obtained has a low content of minerals, especially sodium, and a high content of NPN (for example, sodium content is 10% or lower and NPN recovery rate is 80%). Such a whey product is a novel substance quite unknown in the past. Recovery of NPN, which was not possible in the past, can thus be effected on an industrial scale. This invention has attained an industrially useful production of such a product in which 1 to 20% of sodium and 70 to 85% of non-protein nitrogen have been recovered from whey or whey concentrate used as a staring material in this invention, as compared to sodium content and non-protein nitrogen content in the whey or whey concentrate used as a starting material.

According to this invention, NPN adsorbed on an ion-exchange resin can be recovered not only by desorption by the use of whey or whey concentrate, but also by elution by the use of an eluent. The latter method will be explained below.

Conditions were investigated for the process in which flow of whey or whey concentrate through an ion-exchange resin is stopped before rapid escape of NPN takes place, and an eluent is then applied, thereby eluting NPN alone with minerals left adsorbed. The result was, as is apparent from the Examples described later, that the same correlations between the change of electric conductance and NPN recovery as described above exist if a specific type of eluent is used at a specific concentration and in a specific amount ratio of the eluent to the resin used, and that selective recovery of NPN on an industrial scale can be achieved also by this method.

In this method, are preferably used as the eluent alkaline substances, such as hydroxides of alkali metals (e.g., K and Li) and of alkaline earth metals (e.g., Ca, Mg and Ba). When potassium hydroxide, for example, is used as the eluent, its concentration should preferably be at least 0.4N, more preferably at least 0.8N, and NPN is eluted more rapidly with increasing concentration. In addition, the larger the volume of eluent applied, the higher the recovery rate of NPN; a level of Bed Volume×0.2 or more may be considered as a preferable standard.

In practicing this invention, it is necessary to previously set optimal treating conditions in consideration of the conditions described above and paying attention also to the type of ion-exchange resin used, the height of column layer and the linear velocity. Thus, NPN can be selectively recovered prior to the elution of sodium by measuring electric conductance and pH, or by setting the treating time, or by directly measuring eluted NPN.

Since NPN is recovered in each of the desalted whey and the eluate by this elution method, the desalted whey or the eluate may be individually used or proper mixtures of these two products may be utilized for various purposes. Each of these products is a novel substance featuring a high NPN concentration and a low sodium concentration, and can be used as a novel nutritive or functional food. In addition, efficient recovery of NPN can thus be achieved.

Described below are the Examples of this invention.

EXAMPLE 1

(1) Whey concentrated by a commonly employed method to a total solid (TS) of 24% was desalted by 60% through electrodialysis, the desalted solution was passed through a cation-exchange resin column of 84 cm in height (Amberlyte IR120A; 24 mm in diameter) at a linear velocity of 5.3 m/h, and the changes with time in the contents of individual minerals, electric conductance, pH and NPN content of the effluent were measured. The results obtained are summarized in FIGS. 1(1) and 1(2).

As can be seen from FIG. 1(1), sodium, which is low in the degree of selective adsorption, begins to rapidly escape when the resin's ion exchange capacity becomes saturated. FIG. 1(2) shows the changes with time in electric conductance, pH and NPN content of the same effluent. This figure indicates that, in the initial stage, ion exchange between minerals in whey and hydrogen ions proceeds, resulting in the low electric conductance and the low pH of the effluent, and NPN is also adsorbed on the resin, thus resulting in its low content in the effluent. However, as the flow of desalted whey continues, NPN begins to leave the resin to slowly increase its content in the effluent, and electric conductance and pH begin to increase when the NPN content reaches its peak.

Comparison of the peak of NPN with the peak of sodium shows that NPN reaches its peak earlier than sodium, indicating the lower degree of selective adsorption of NPN than sodium.

As is apparent from the foregoing, selective separation and recovery of NPN from minerals (especially sodium), which was impossible in the past, can be first achieved by this invention.

(2) Whey concentrated to 24% was desalted by 60% through electrodialysis, the desalted solution was passed through a cation-exchange resin column of 85 cm in height (Amberlyte IR120A; 24 mm in diameter) at a linear velocity of 5.3 m/h, and the distribution of adsorption zones of NPN and minerals inside the column was measured. The result obtained is summarized in FIG. 2.

This figure shows each ratio of NPN concentration and electrical conductance (ordinate) at the column outlet to the data at the column inlet, plotted against time (abscissa), in which minerals comprising a plurality of salts are represented by the change of electric conductance. It is clear that, also under these conditions, electric conductance begins to increase when the NPN concentration reaches its peak.

Figure 3:
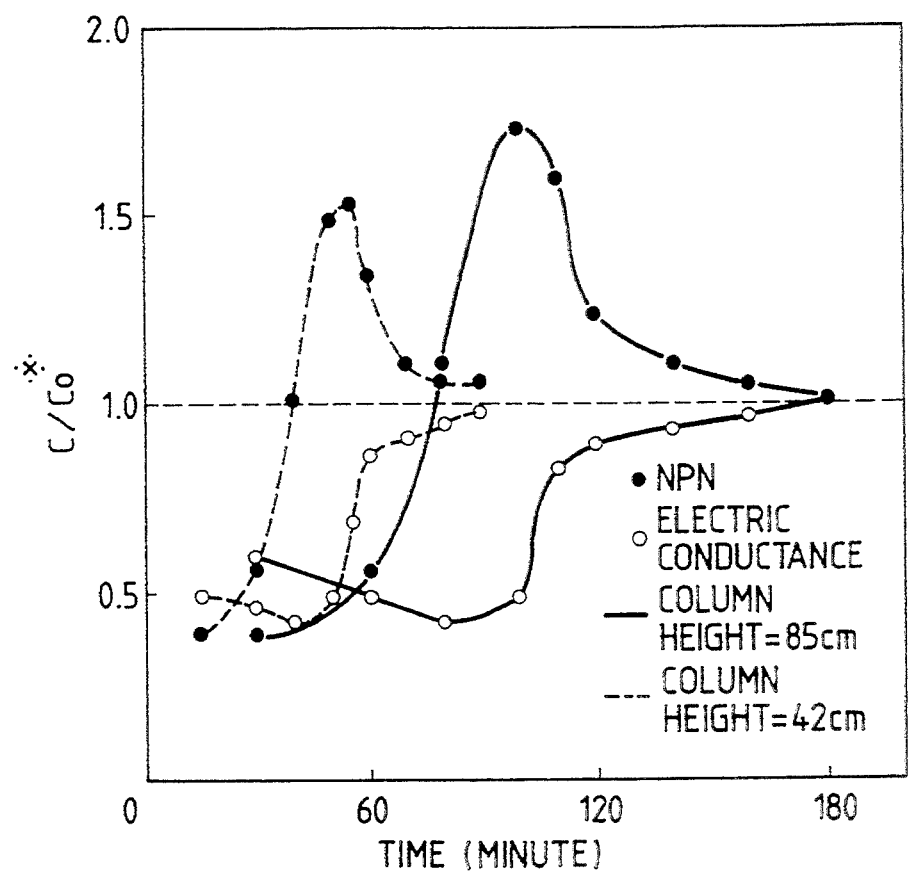
FIG. 3
This illustrates the effect of column-layer height upon electric conductance and NPN content.

(3) An experiment was performed in much the same way as in Paragraph (2) above, except that the height of column layer was about half (42 cm), and the distribution of adsorption zones of NPN and minerals inside the column was measured. The result obtained is summarized in FIG. 3.

This figure shows that, when the height of column layer is decreased, separation is not complete, the electric conductance begins to increase before the NPN concentration reaches its peak, and the peak value of NPN concentration is also low, indicating that separation of NPN from minerals is difficult under these conditions.

Figure 4:
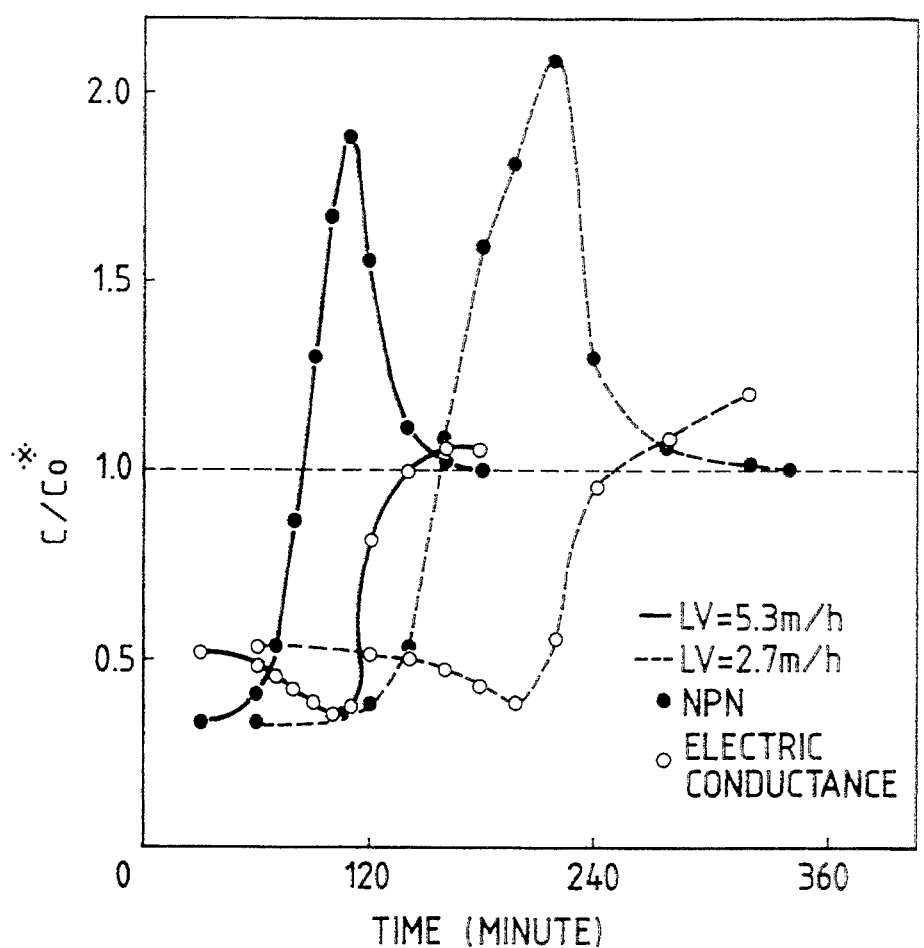
FIG. 4
This illustrates the effect of linear velocity upon electric conductance and NPN content.

(4) An experiment was performed in much the same way as in Paragraph (2) above, except that the linear velocity(LV) was decreased about half (2.7 m/h), and the distribution of adsorption zones of NPN and minerals inside the column was measured. The result obtained is summarized in FIG. 4.

This figure shows that, when the linear velocity is halved, the peak of NPN concentration becomes higher, indicating a higher degree of concentration caused by the longer contact time with the resin. The electric conductance begins to increase earlier than the NPN concentration reaches its peak, indicating more conspicuous separation of NPN from minerals.

Figure 5:
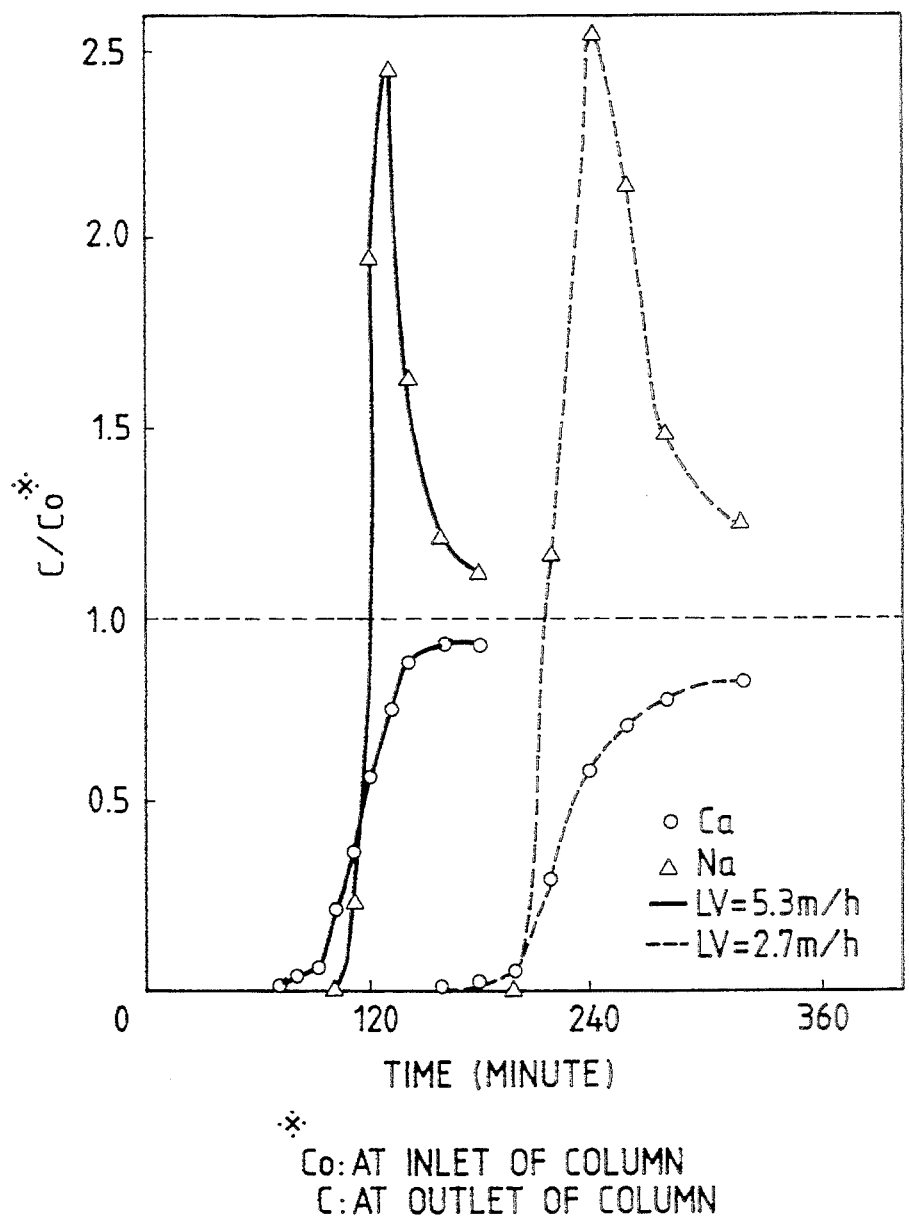
FIG. 5
This illustrates the effect of linear velocity upon the desorption of sodium and calcium.

(5) An experiment was performed in much the same way as in Paragraph (4) above, and each ratio of the concentration of individual minerals (sodium and calcium) at the column outlet to the concentrations at the column inlet was measured. The result obtained is summarized in FIG. 5.

This figure shows that, when the linear velocity is lowered, sodium, which is second to NPN in the low degree of selective adsorption, is concentrated and is apt to escape as NPN, thus starting the increase of electric conductance somewhat earlier. It is also clear that calcium is easier to desalt at the lowered linear velocity.

Figure 6:
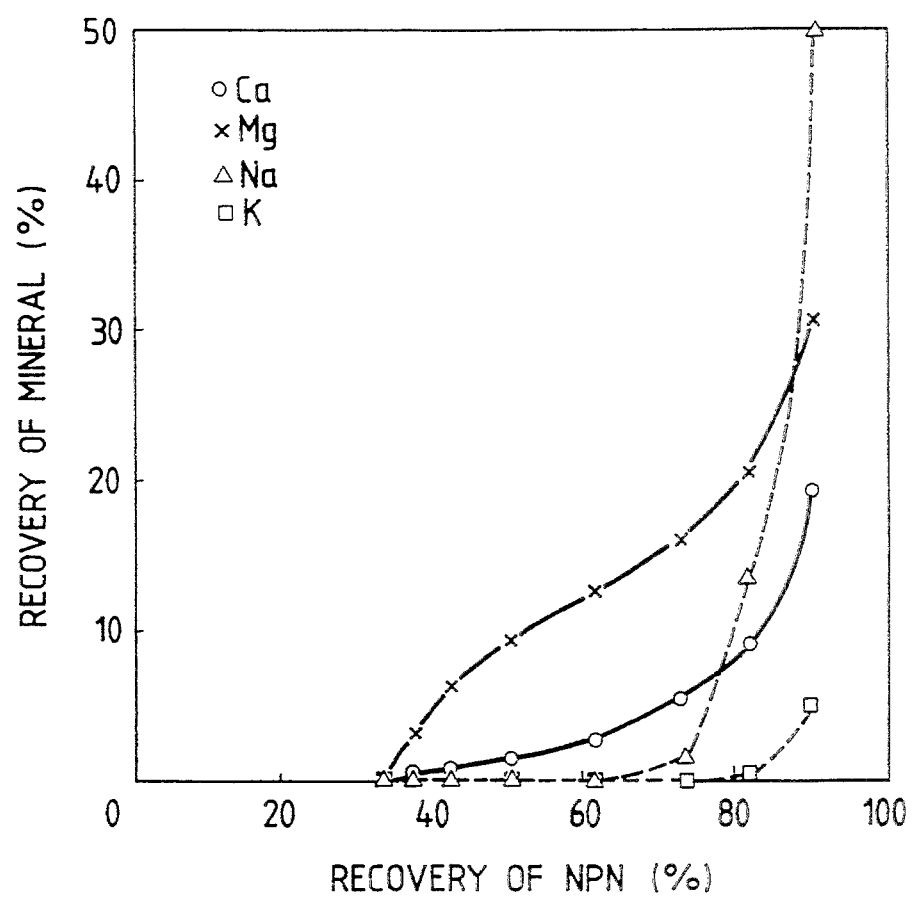
FIG. 6
This illustrates the relationship between the recovery rate of NPN and the recovery rates of individual minerals.

(6) An experiment was performed under the same conditions as in Paragraph (1) above, and the recovery rates of NPN and individual minerals were measured when the flow of desalted solution was stopped. The result obtained in summarized in FIG. 6.

As is apparent from this figure, when whey with a volume of 13 times that of resin is treated and then water is passed, the recovery rate of NPN was as high as 90%, but minerals (especially sodium) were also recovered. On the other hand, when whey with a volume of 10.8 times that of resin is treated and then water is passed, the recovery rate of NPN was 80%, that of sodium was not more than 10% and that of magnesium was 20%. These results are due to the low magnesium concentration at the column inlet, and it was demonstrated that separation can be effected more efficiently if the height of column layer is further increased and the linear velocity is decreased, thereby lowering the recovery rate of minerals and further enhancing the NPN recovery rate.

It was thus demonstrated that, according to this invention, NPN adsorbed on a resin can be selectively desorbed with no escape of sodium.

Hence, it is possible to efficiently recover NPN from whey, and the thus obtained whey concentrate can be widely used as ordinary food, as nutritious, health food and as functional food, because it is rich in NPN and other useful components and is free of sodium which is injurious to patients with hypertension or renal troubles and to persons having a fear of taking these diseases.

EXAMPLE 2

NPN is obtained in this case by passing whey through an ion-exchange resin and recovering NPN adsorbed on the resin by the use of an eluent.

(1) Whey concentrated to a total solid of 24% by a method commonly employed was desalted by 60% through electrodialysis.

The whey concentrate thus obtained was passed through an ion-exchange resin, flow of the whey concentrate was stopped before rapid escape of NPN took place, an eluent was then applied to recover NPN, and conditions to recover NPN alone, with minerals left adsorbed, were examined. The ion-exchange resin operating conditions were similar to the conditions used in Paragraph (1) of Example 1, except that the height of column layer was 21 cm and the linear velocity was 1.1 m/h.

(2) Calcium, which is high in the degree of selective adsorption on ion-exchange resins, was at first selected and calcium chloride was tested as an eluent. The result was that NPN could not be recovered unless the concentration of calcium chloride was sufficiently high.

When calcium chloride is applied, hydrogen ions generated by ion exchange will rapidly lower the pH of solution having no buffer action, thus increasing the electric charge on NPN and making it easier to be adsorbed on the resin. This may probably be one of the causes for the undesirable result obtained above. In addition, use of high-concentration calcium chloride increases the chlorine content, which threatens to adversely affect the succeeding concentration step.

(3) Alkalies were then adopted as the eluent type not to lower pH and not to use chlorine, and water-soluble potassium hydroxide was selected because of its relatively high degree of selective adsorption. It was used as solutions of various concentrations (0.4N, 0.8N and 1.6N), and the volume of solution applied was controlled so that the amount of potassium hydroxide will be the same. To be concrete, the actual volume applied was Bed Volume (BV)×2 for 0.4N concentration, BV×1 for 0.8N concentration, and BV×0.5 for 1.6N concentration.

Figure 7:
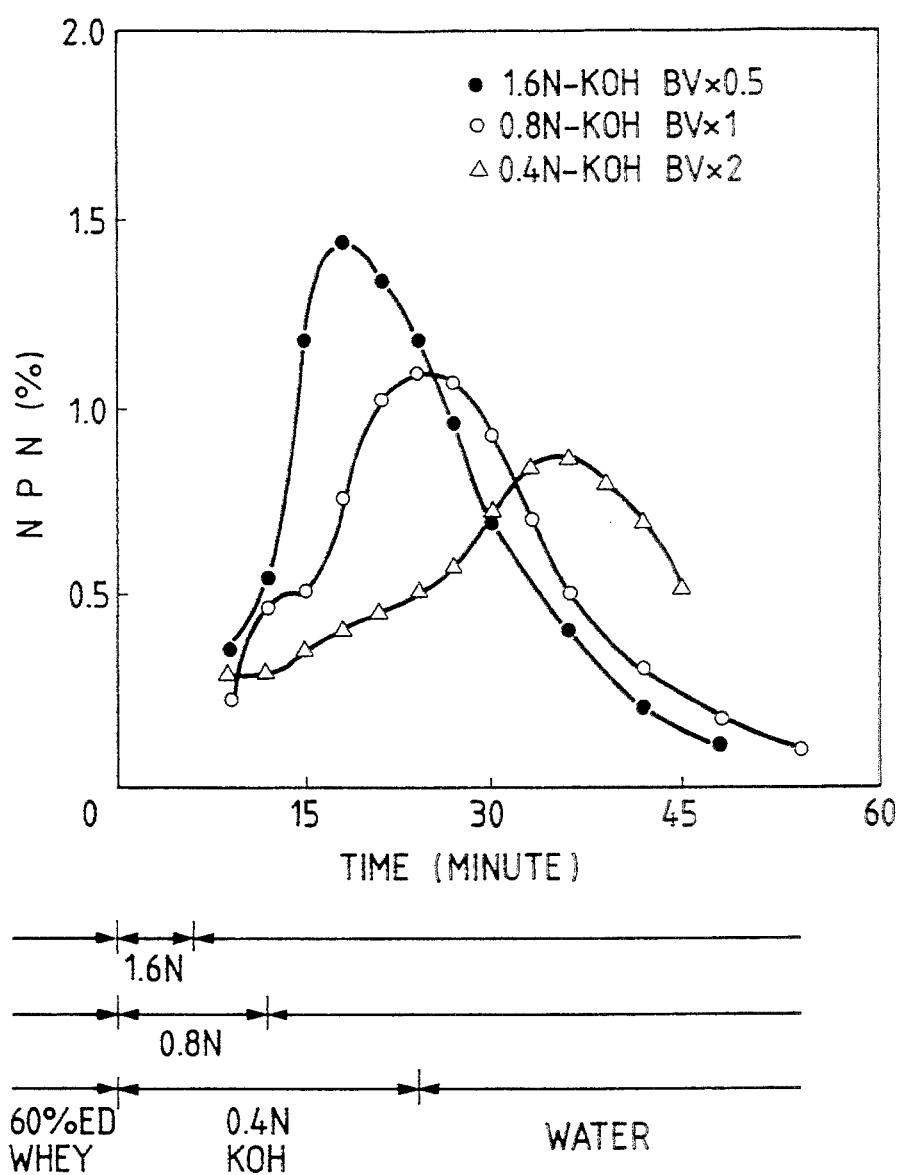
FIG. 7
This illustrates the effect of concentration and volume of applied eluent upon the recovery of NPN.

After passing the whey concentrate with a volume of six times that of resin, each of the potassium hydroxide solutions of different concentrations was applied, water was then passed, and the change in NPN concentration with the passage of time was measured. The result is shown in FIG. 7 as NPN recovery rate.

As can be seen from this figure, tile peak of NPN concentration is higher with increasing potassium hydroxide concentration; as the concentration of potassium hydroxide becomes lower, the peak of NPN concentration lowers, indicating its slow escape. NPN recovery rates based on its amount contained in the applied whey concentrate were 57%, 53% and 46%, respectively. Electric conductance, on the other hand, was excessively high, indicating the escape of sodium and other minerals. This is probably due to the excessive amount of cations.

Figure 8:
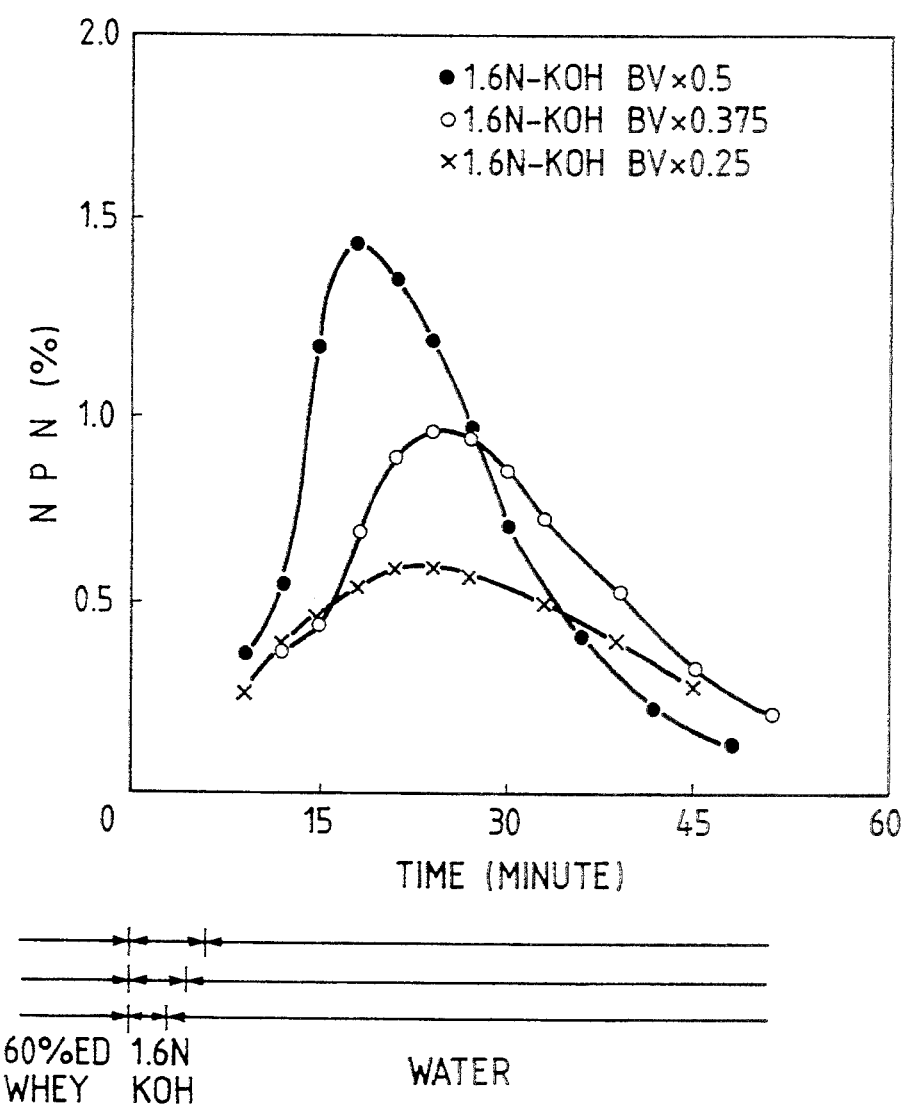
FIG. 8
This illustrates the effect of volume of an applied eluent (1.6N-KOH) upon the recovery of NPN.

(4) Based on the result obtained above, 1.6N potassium hydroxide solution was used with its applied volume decreased to 75% and 50% (with the amount of potassium hydroxide decreased), and the recovery rates of NPN and minerals were measured. The result obtained is shown in FIG. 8. What was intended is to flow a small amount of high-concentration potassium hydroxide solution by spot application to subject it to ion exchange with minerals on the upper layer of column, thereby causing the ion-exchanged minerals to desorb NPN adsorbed on the lower layer of column.

Consequently, it was demonstrated that the decreased volume of potassium hydroxide solution applied lowered the NPN peak and the NPN recovery rates were 57%, 49% and 35%, respectively, indicating the correctness of the presumption described above.

Though not shown in the figure, electric conductance hardly increased when potassium hydroxide solution was applied in a small volume. Hence, if the volume of potassium hydroxide solution applied is properly controlled, escape of minerals can be prevented although the NPN recovery rate may be somewhat low, thus enabling selective recovery of NPN alone.

Figure 9:
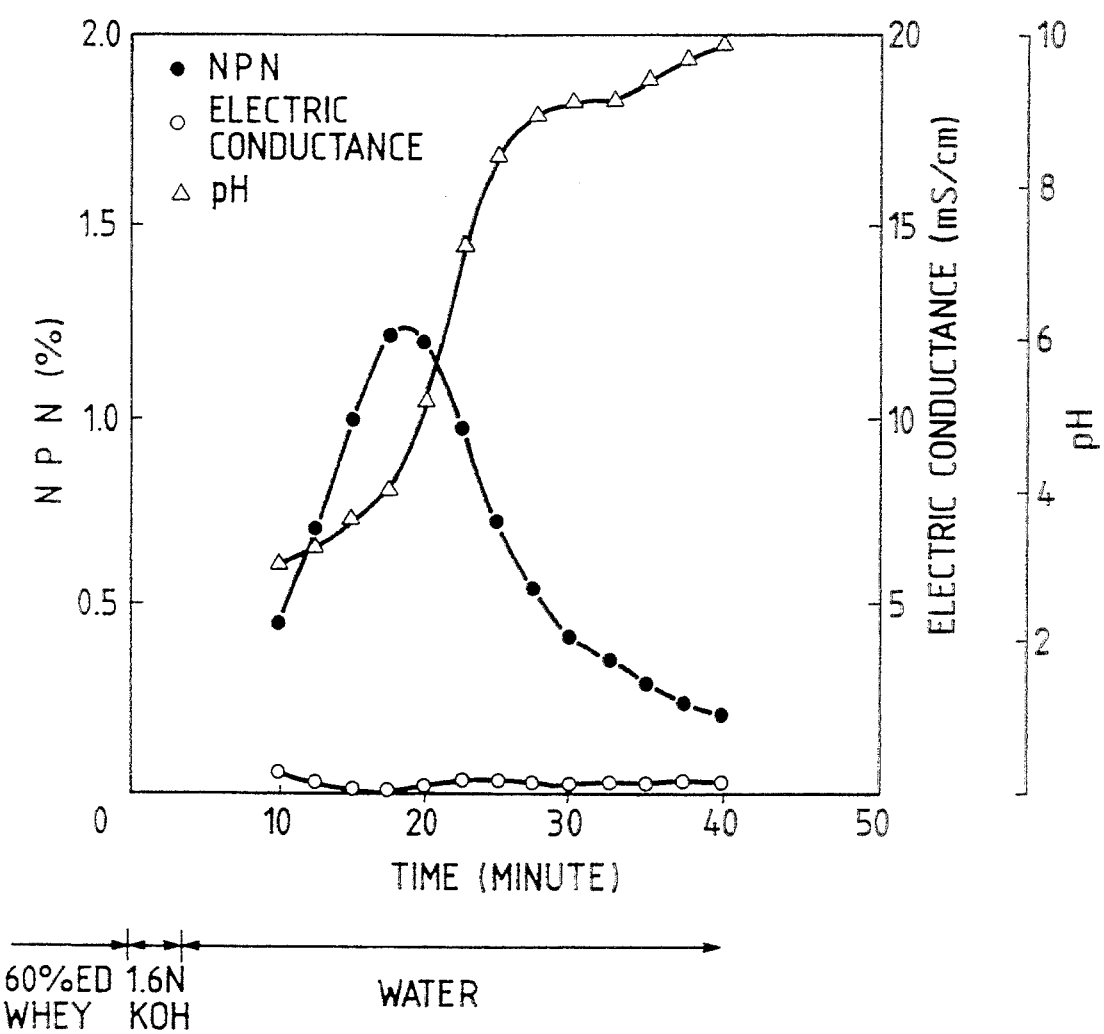
FIG. 9
This illustrates the change with time in eluate from a cation-exchange resin when potassium hydroxide is used as eluent.

(5) An experiment was performed in much the same way as in Paragraph (1) above, except that the height of column layer was 85 cm and the linear velocity was 5.3 m/h. After passing whey concentrate with a volume of six times that of resin, 1.6N potassium hydroxide solution was passed in a volume of 0.375 time that of resin, and the changes in NPN content, electric conductance and pH of the eluate were measured. The result obtained is summarized in FIG. 9.

This figure shows that NPN was separated from minerals more efficiently, the peak concentration of NPN was raised, and electric conductance remained almost unchanged. The contents of sodium and potassium in the eluate were 5 mg/g of NPN and 1 mg/g of NPN, respectively.

The mass balance of NPN was 40% in the desalted whey, 50% in the eluate, and 10% left on the cation-exchange resin. Probably, the NPN contained in the desalted whey is mainly uncharged urea. The NPN-containing solutions thus obtained were concentrated by using a beaker, the concentrate was then mixed with lactose, and the mixture was spray-dried, giving powder of good quality. This operation offered no problem at all.

As is apparent from the foregoing, NPN was recovered at a rate of about 80% when eluted with whey, and at a rate of about 50% when eluted with an alkali. What is to be noticed here is that the value obtained by the use of whey includes uncharged urea. It was demonstrated that the method of eluting NPN by the use of an alkali is an economical process for isolating and purifying NPN which employs existing manufacturing equipment.

Effects Achieved by the Invention

This invention succeeded for the first time in selectively recovering NPN alone from whey on an industrial scale, with the contents of minerals (especially the content of sodium) markedly decreased.

Thus, this invention provides an industrial process for selectively recovering NPN, and the whey or whey concentrate obtained by this invention can be safely used as various food, nutritious food and functional food, because it contains a large amount of NPN rich in physiologically active substances and contains only minimized amounts of harmful minerals (especially sodium), thus having no danger of causing harmful side effects.

In addition, this invention provides new uses of whey, which has hitherto been employed only as a source of lactose, and is therefore very excellent in the aspect of effective utilization of natural resources.

What is claimed is:

1. Whey or whey concentrate having content of sodium of 1 to 20% and content of non-protein nitrogen of 70 to 85% as compared to content of sodium and content of non-protein nitrogen in untreated whey or whey concentrate, respectively, which is prepared by the process which comprises (1) passing whey or whey concentrate through a column of a cation-exchange resin in order to adsorb sodium and non-protein nitrogen compounds;

(2) passing the same whey or whey concentrate as used in step (1) through the column in order to desorb non-protein nitrogen compounds selectively by utilizing difference in elution behavior between non-protein nitrogen compounds and sodium, each amount of whey or whey concentrate passed in steps (1) and (2) having been determined in advance so as not to cause desorbing of sodium, taking account of ion exchange capacity of the cation-exchange resin;

(3) forcing out whey or whey concentrate remaining in the column by passing water; and (4) obtaining, a whey concentrate, a mixture of a solution which flowed out of the column in step (1) and a solution which flowed out of the column in step (2).

* * * * *